United States Patent
Van den Branden et al.

(10) Patent No.: US 6,202,266 B1
(45) Date of Patent: Mar. 20, 2001

(54) CLAMP FOR MOUNTING STORAGE ACCESSORIES

(75) Inventors: David J. Van den Branden; Paul C. Evans, both of Chicago, IL (US); Michael D. McCoy, Buena Vista, CO (US); Dale E. Fahnstrom, Chicago, IL (US); Burt F. Mendelson, Northbrook, IL (US); Lawrence J. Pomerleau, Lake Zurich, IL (US); Charles Dresner, Northbrook, IL (US); Kelly Whittier, Waukegan, IL (US); Christopher V. Conley, Chicago, IL (US); Scott A. Ternovits, Chicago, IL (US); Maureen A. O'Connor, Chicago, IL (US)

(73) Assignee: Kenlin Group, Inc., Highland Park, IL (US)

( * ) Notice: Subject to any disclaimer, the term of this patent is extended or adjusted under 35 U.S.C. 154(b) by 0 days.

(21) Appl. No.: 09/348,934

(22) Filed: Jul. 7, 1999

(51) Int. Cl.[7] ............................ A44B 21/00; A47G 25/12; F16B 2/02
(52) U.S. Cl. ............................ 24/569; 24/68 CD; 24/514; 24/507
(58) Field of Search ............................ 24/569, 514, 535, 24/522, 507, 499

(56) References Cited

U.S. PATENT DOCUMENTS

| | | |
|---|---|---|
| D. 204,086 | 3/1966 | Russell . |
| D. 337,004 | 7/1993 | O'Day et al. . |
| D. 374,000 | 9/1996 | Wood et al. . |
| D. 387,092 | 12/1997 | Elkins . |
| 2,531,107 * | 11/1950 | Burkey .................................. 24/569 |
| 2,926,410 | 3/1960 | Normadin . |
| 2,953,836 * | 9/1960 | Crook ..................................... 24/569 |
| 3,135,034 * | 6/1964 | Fauteux .................................. 24/507 |
| 3,396,438 | 8/1968 | White . |
| 3,904,161 * | 9/1975 | Scott ..................................... 248/43 |
| 3,986,746 * | 10/1976 | Chartier ................................. 24/569 |
| 4,824,049 * | 4/1989 | Kelly, Sr. ........................... 24/68 CD |
| 4,854,016 * | 8/1989 | Rice ..................................... 24/514 |
| 5,344,115 | 9/1994 | Mayne et al. . |
| 5,478,041 | 12/1995 | Mayne . |
| 5,769,292 * | 6/1998 | Cucheran et al. ...................... 24/569 |

* cited by examiner

Primary Examiner—Victor N. Sakran
(74) Attorney, Agent, or Firm—Tilton, Fallon, Lungmus & Chestnut

(57) ABSTRACT

A versatile user-adjustable clamp for clamping accessories to the panels of ready-to-assemble furniture articles, and other surfaces such as countertops, has a main body member, a jaw member, and a knob. The main body member has a substantially spool-shaped section with accessory interface means at opposing ends thereof, and a rectangular section that projects tangentially from the spool-shaped section. The spool-shaped section of the main body member telescopingly receives the jaw member, and has a knob-receiving aperture. The knob is rotatably secured within the knob aperture and provides a means for actuating the telescopic movement of the jaw member relative to the main clamp body. The jaw member includes a flat surface interface that is oriented parallel to the rectangular section of the main clamp body, and has a separate accessory interface means therein. This separate accessory interface means can include a snap-lock feature, allowing users to confirm that the clamp is securely fastened to an associated accessory. The clamp can be used as a hinge when rotatably mounted to a pair of hinge-halves that comprise a further accessory interface means, using the first two accessory interface means.

21 Claims, 11 Drawing Sheets

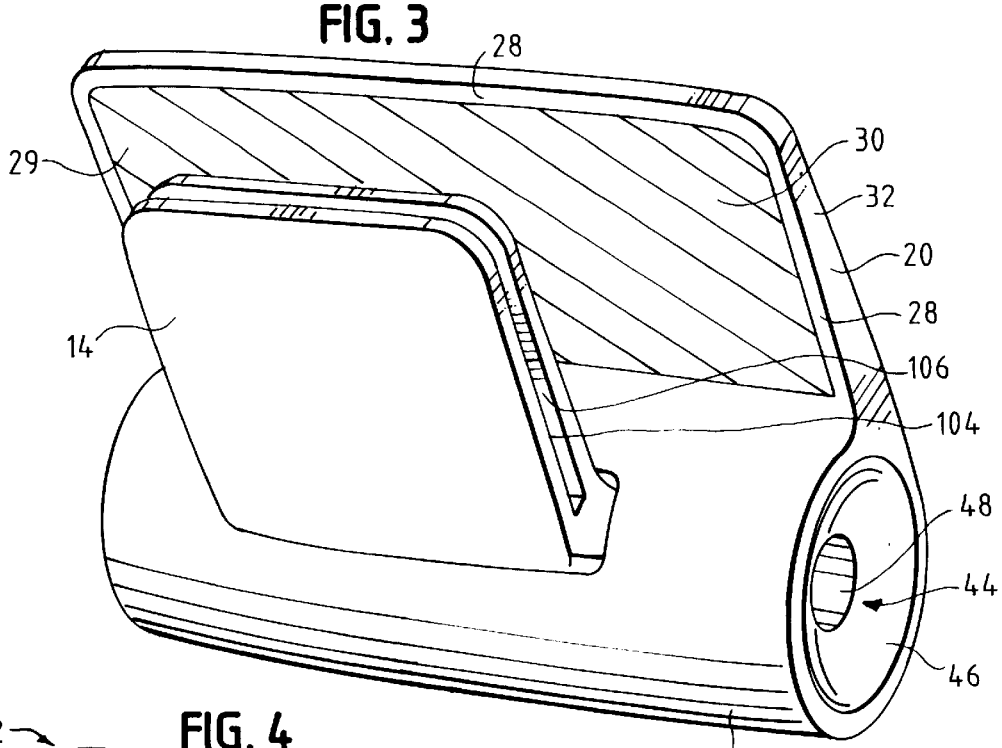
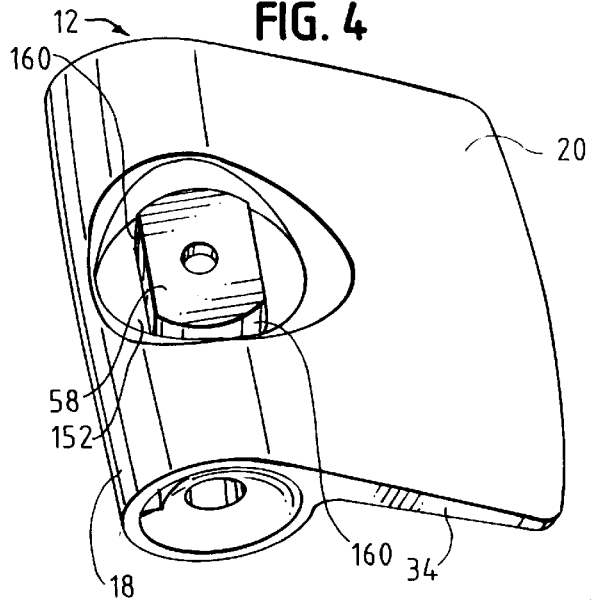
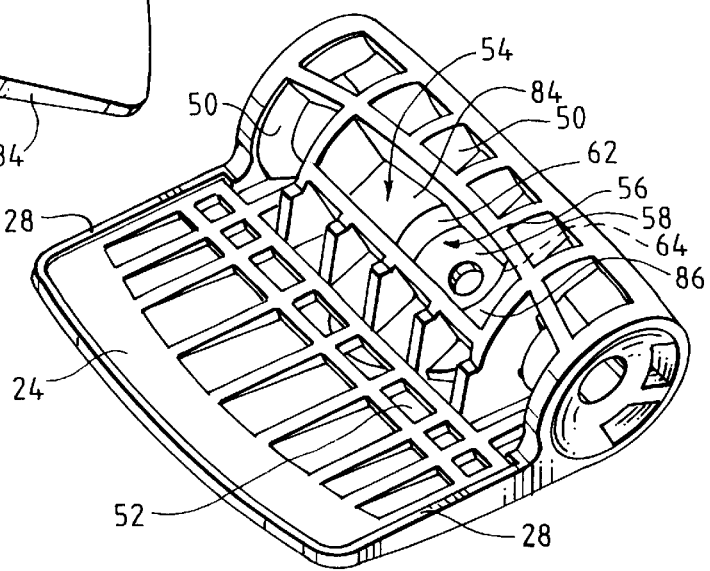

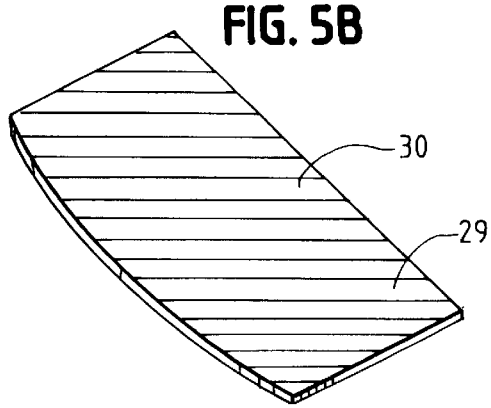
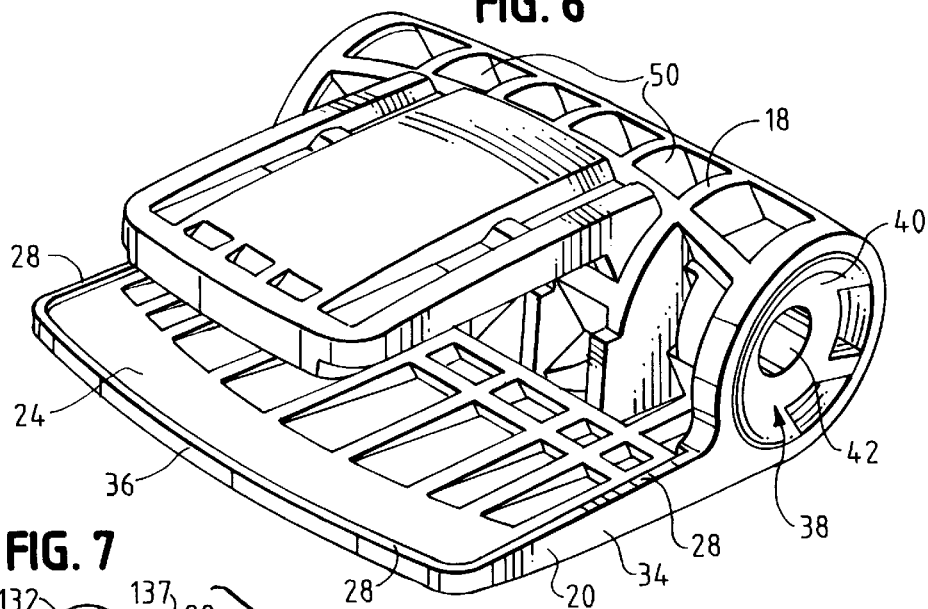
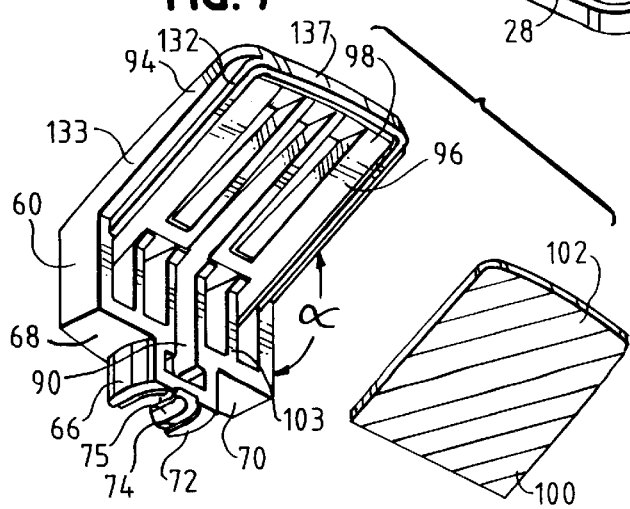
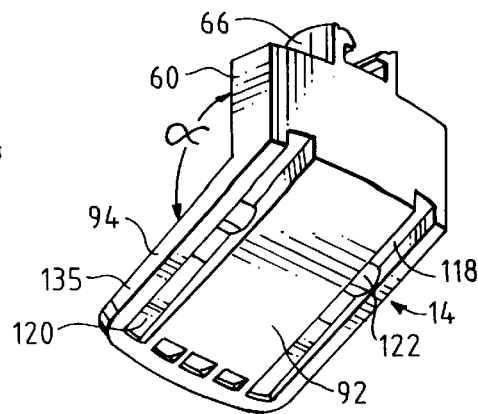

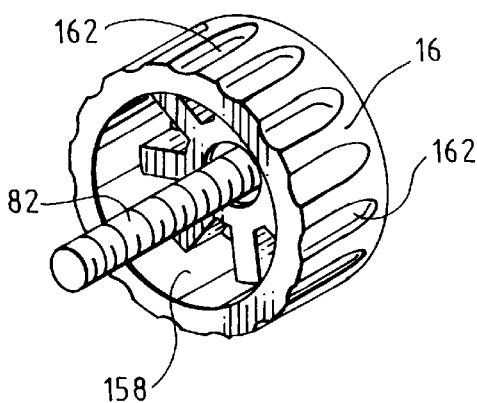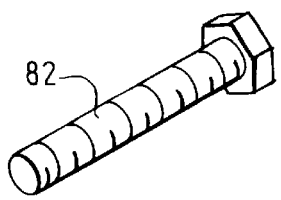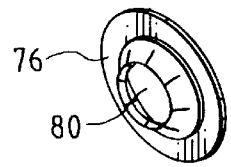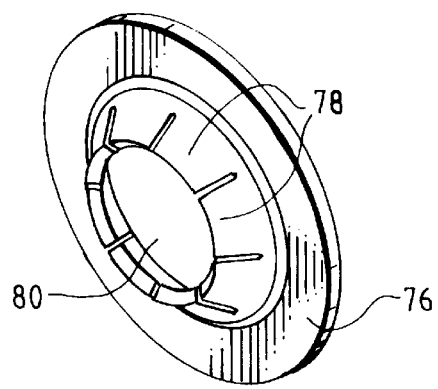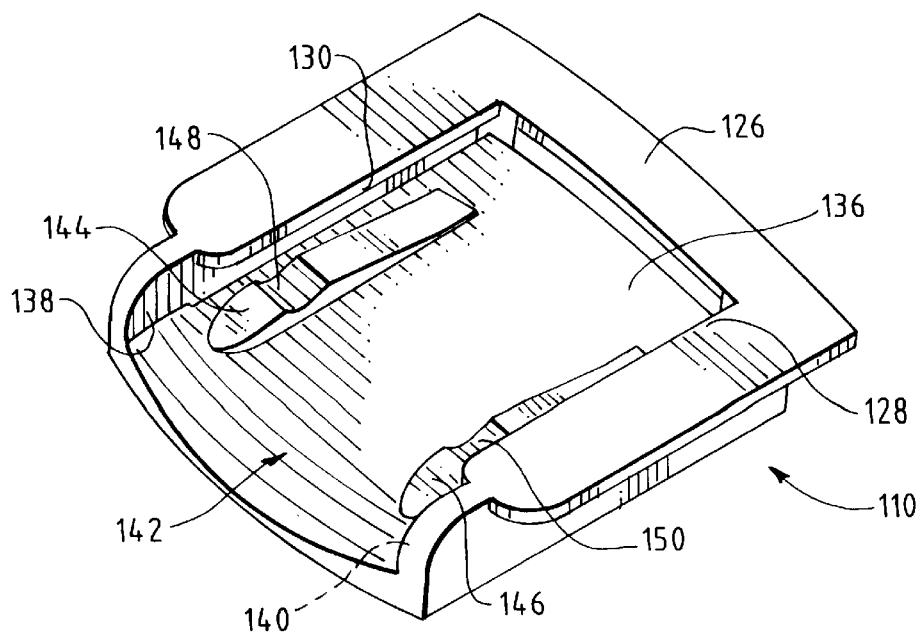

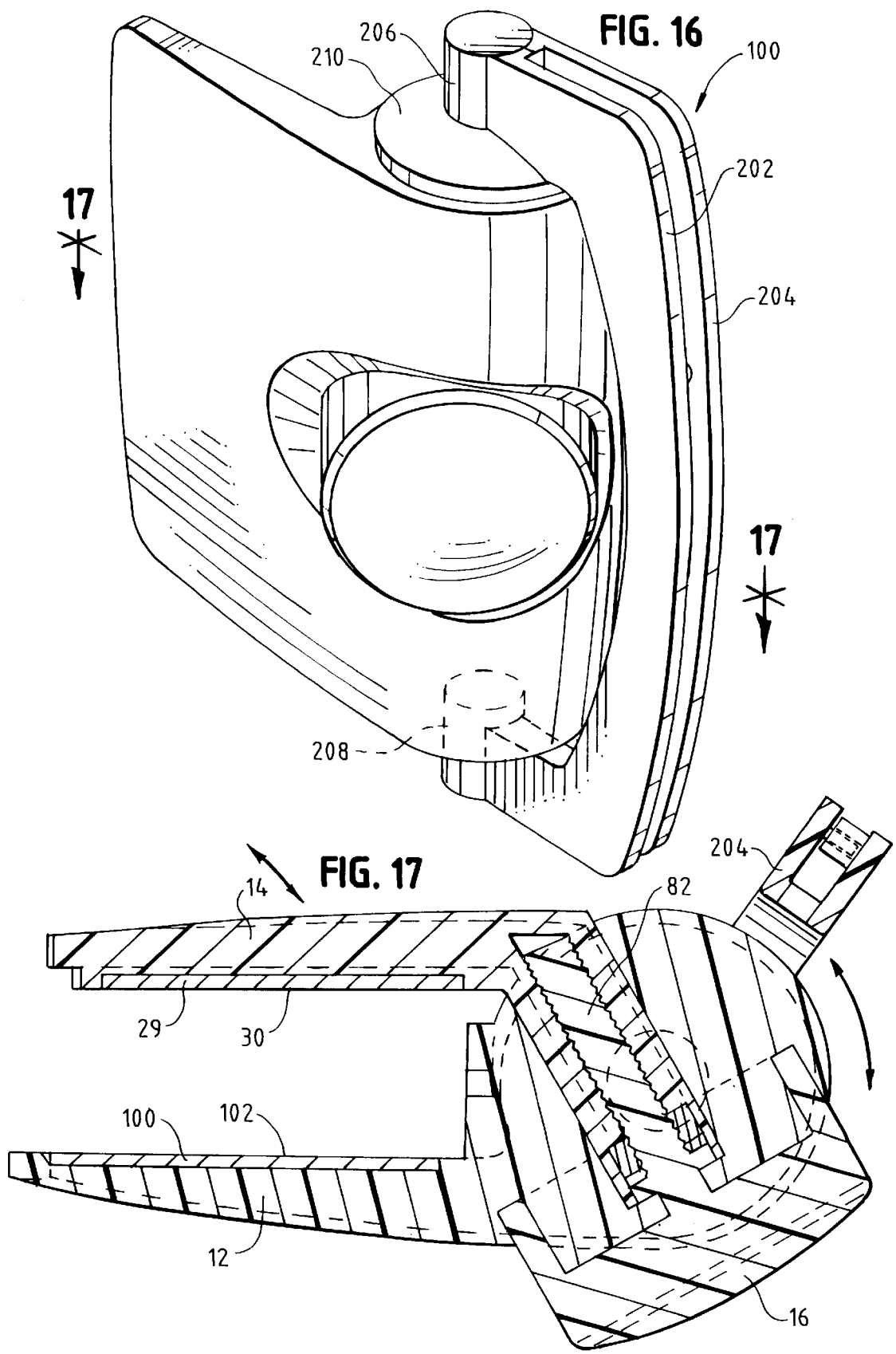

CLAMP FOR MOUNTING STORAGE ACCESSORIES

BACKGROUND

1. Field of the Invention

This invention relates generally to clamping devices and, more specifically, to a versatile clamp for mounting of a variety of storage accessories to furniture articles.

2. Background of the Invention

The advent of ready-to-assemble ("RTA") furniture revolutionized the furniture industry in the last decade. Kits including wood or fiber board panels and fasteners provide easy to assemble furniture articles, such as desks, shelving units, and cabinets. These RTA furniture articles are used increasingly in home offices or in cubicle-type office settings due to their ease of installation, aesthetics, and comparatively low cost. Many such RTA furniture items are used for housing home or office computers or stereo equipment, or organizing papers and files.

Computers present unique organizational challenges to their users, due to the large number of accessories and peripherals used with a computer, such as a mouse, computer floppy disks, CD-ROM disks, and associated cables. It would be desirable for furniture articles to be easily adapted to include convenient means for storing these and other objects within easy reach of a user, but also in a neat, organized, aesthetic manner.

While there have been attempts to provide clamps for mounting organizational and storage accessories (for convenience, the terms organizational and storage are used interchangeably herein) to furniture articles, none of these attempts provide adequate versatility to accommodate a wide variety of storage accessories. Prior art clamps also have at most only one interface means to accommodate accessories. The versatility of a clamp can be greatly increased by providing multiple accessory interface means.

Many prior art clamps, such as that shown in Hopwood, U.S. Pat. No. 5,549,268, utilize coiled springs to bias the jaws of the clamp toward a closed position. Because such clamps are self-closing, they present a problem of premature closing. It is not uncommon for users to get their fingers caught in the clamp jaws while attempting to secure the clamp onto a surface. It is therefore desirable for a clamp to be equipped with means for the user to more easily control the opening and closing of the clamp jaws.

Another drawback of prior art clamps is that the coiled springs typically have one or more sharp ends that are exposed. A user could scratch his or her skin, or clothing could get caught on these exposed sharp ends. Yet another drawback of these prior art spring clamps is that the user has no control over the clamping force. Instead, the stiffness of the spring causes a restoring force to bias the jaws of the spring toward a closed position. If the restoring force is too strong, there is a possibility of degradation of the surfaces to which the clamp is secured.

A corollary problem associated with such prior art spring clamps is that the more stiff the spring, the more force that is required for the user to open the jaws of the clam in order to release it. These clamps are particularly problematic for persons of modest strength, who may have difficulty overcoming the restoring force to open the clamp jaws. It would therefore be desirable to have a clamp that has jaws which a user could easily open and close, and that the clamp have an internal, unexposed mechanism. It would further be desirable for such a clamp to have a tightness that is user-adjustable, so that the user could set the amount of force with which to close the jaws onto surfaces such as panels of furniture articles, and thereby avoid degradation of the panel surfaces.

It would also be desirable for a clamp to be easily coupled with a variety of different types of interchangeable accessories, so that a single clamp could be used to secure an entire product line of accessories to RTA furniture or elsewhere. Likewise, it would be desirable for the clamp to have accessory interface means wherein uncoupling or disengaging storage accessories from the clamp is easy and does not require excessive force. Another beneficial feature would be for the clamp to provide the user with both a tactile and audible means for determining when the clamp is adequately secured to a given accessory, such that the given accessory will not become prematurely disengaged from the clamp when the clamp is mounted to a panel of RTA furniture, for example.

The manner in which the present invention overcomes these and other shortcomings of the prior art will become clear in the following Summary of the Invention, the Detailed Description of the Preferred Embodiment, and the drawings.

SUMMARY OF THE INVENTION

The present invention achieves a versatile clamp for mounting a wide range of storage accessories to furniture articles. The basic clamp consists of essentially three interdependent parts that cooperate to perform a means for securing the clamp to a section of paneling, such as the sidewall of a shelving unit, a desk, or a table-top. Accessory interface means are provided at different locations of the clamp to accommodate different types of storage accessories and increase the versatility of the clamp. Most accessories to be secured to the clamp are adapted to couple with at least one of these accessory interface means.

For clarity in the description, the features of the clamp are described herein with respect to their relative spatial relationship. Thus, although terms such as "upper", "lower", "front", "rear", and the like are used herein for convenience, it will be understood that the clamp of the present invention can be mounted in any orientation. The main body of the clamp includes a generally spool-shaped section having recessed apertures at the upper and lower opposing ends thereof to provide first and second storage accessory interface means, and a rectangular section that projects tangentially form the spool-shaped section. The rectangular section has a rectangular recess in a first (rear) side thereof, in which a pliant, flat, non-abrasive, anti-skid pad serving as a first panel interface surface is received. In a preferred embodiment, the rectangular section extends the full height of the spool-shaped section, and the anti-skid first panel interface surface extends over most of the surface area of the rear side of the rectangular section.

The spool-shaped section of the clamp includes a generally circular aperture therein to receive a hand adjustable knob. This circular aperture extends only partially into the spool-shaped section, for reasons that will be appreciated by reference to the Detailed Description of the Preferred Embodiment. A preferred embodiment of the clamp further includes crescent-shaped depressions laterally adjoining the circular knob-receiving aperture in the spool-shaped section, which advantageously provide increased accessibility to a knob received in the aperture.

Opposite to the knob-receiving aperture, the spool-shaped section of the clamp has an elongated opening that is contiguous with the knob-receiving aperture. Preferably sideways T-shaped in cross-section, the elongated opening provides a slot to receive a first section of a jaw member. The first section of the jaw member includes an elongated wall having a relatively short body portion. A laterally oriented fastener-receiving slot is present in the short body portion of the first section of the jaw member near a front end thereof. The first section of the wall member includes a bore therein for receiving a threaded rod. The bore extends through the short body portion of the first section and terminates at the rear end of the jaw member.

A second section of the jaw member is maintained parallel to and spaced apart from the first panel interface of the rectangular section of the main clamp body throughout the travel of the jaw member relative to the spool-shaped section of the clamp. The second section of the jaw member has a rear-facing side and a front-facing side. The front-facing side includes a jaw recess for receiving a pliant flat, non-abrasive anti-skid pad used as a second panel interface surface.

The second section of the jaw member is preferably shorter than the first panel interface, and is provided with an accessory interface means in the form of a coupling means used to secure a given accessory to the clamp. In one less-preferred embodiment, this accessory interface means is in the form of a continuous groove or recess in three sides of the perimeter of the second panel interface, which cooperates with a corresponding aperture or flange provided in or on the given accessory for a bayonet-type fitting. It is recognized that instead of a continuous groove or recess in the perimeter, a system of interrupted grooves or recesses can be provided in the three sides of the perimeter of the second section of the jaw member. The system of grooves or recesses would cooperate with a set of corresponding flanges and recesses in a flat surface or projection of a storage accessory to secure the given accessory to the clamp.

Alternatively, in a more preferred embodiment of the present invention, the accessory interface means in the jaw member takes the form of a buckle-type interlocking mechanism. In this embodiment, the rear-facing side of the second section of the jaw member includes a pair of parallel, spaced-apart grooves or locking channels that are laterally open on at least one side of the jaw member, i.e. the locking channels extend all the way to at least one lateral side edge of the second section of the jaw member. Each of the parallel locking channels is provided with a locking bump or ridge portion therein. A clamp-to-product interface, that can be permanently secured to a given accessory by solvent-welding, for example, includes a jaw-receiving channel to lockingly couple with the second section of the jaw member.

The jaw-receiving channel of the clamp-to-product interface includes a pair of ramp members, each having a ridge-receiving depression. When the second section of the jaw member is fully inserted in the jaw-receiving channel of the clamp-to-product interface, the ridges within the parallel locking channels of the jaw member lockingly engage the corresponding depressions in the ramp members. Some force is required to push the ridges up the ramps, and when the ridges lockingly fall in place within the depressions, the user feels and hears an audible "snap," indicating the accessory is securely fastened to the jaw member of the clamp. To disengage the clamp from the given accessory, some force is required to pull the ridges back out of the recesses, but once the ridges are pulled passed the recesses, the jaw member is simply removed from the channel.

The jaw member is telescopingly mounted to the spool-shaped section of the main clamp body, preferably by a thread-engaging fastener means seated in the fastener-receiving slot, which rides along a threaded rod or screw post fixed at, e.g. insert-molded to, the inside of the knob seated in the knob-receiving aperture. By turning the knob clockwise or counterclockwise, the jaw member telescopes into or out of the spool-shaped section, thus increasing or decreasing the distance between the first and second panel interface surfaces.

Preferably, the knob is provided with means to attach to the spool-shaped section to maintain constant positioning of the knob relative to the spool-shaped section. This is accomplished using a one-way fastener or so-called tinnerman, such as a metal push-on retaining fastener. Throughout the travel of the telescopingly mounted jaw member within the spool-shaped section, the second anti-skid panel interface surface of the jaw member maintains a parallel orientation with respect to the first anti-skid panel interface surface of the main clamp body.

A particularly advantageous application of the clamp of the present invention is its use with a pair of C-shaped mounting members or hinge-halves rotatably mounted in the first and second storage accessory interface means to form a hinge for hingedly mounting accessories, such as door panels. As is explained in greater detail below, the various storage accessory interface means provide many other uses and advantages of the clamp.

BRIEF DESCRIPTION OF THE DRAWINGS

FIG. 3 is a rear perspective view of the first embodiment of the clamp shown in FIG. 1;

FIG. 4 is a front perspective view of the main clamp body of a second embodiment of the clamp;

FIG. 5 is a rear perspective view of the main clamp body shown in FIG. 4;

FIG. 5B is a rear perspective view of an anti-skid pad for use as a front panel interface surface received in a recess of the rectangular section of the main clamp body of FIG. 5;

FIG. 6 is a rear perspective view of the second embodiment of the clamp of the present invention;

FIG. 7 is a front perspective view of the jaw member of the clamp shown in FIG. 6, and an anti-skid pad for use as a rear panel interface surface received in a recess of the second section of the jaw member;

FIG. 8 is a rear perspective view of the jaw member shown in FIG. 7;

FIG. 9 is a rear perspective view of the knob in combination with a threaded rod;

FIG. 10 is a rear perspective view of the threaded rod of FIG. 9;

FIG. 11 is a rear perspective view of a one-way fastener;

FIG. 12 is an enlarged view of the one-way fastener of FIG. 11;

FIG. 13 is a front perspective view of the clamp-to-product interface;

FIG. 16 is a front perspective view of the clamp of the present invention in combination with a pair of hinge-halves or mounting members, with which the clamp cooperates to form a hinge;

FIG. 17 is a cross-sectional view of the clamp of FIG. 16 in combination with the pair of hinge-halves, taken along lines 17—17 of FIG. 16;

DETAILED DESCRIPTION OF THE PREFERRED EMBODIMENT

Figure 1:
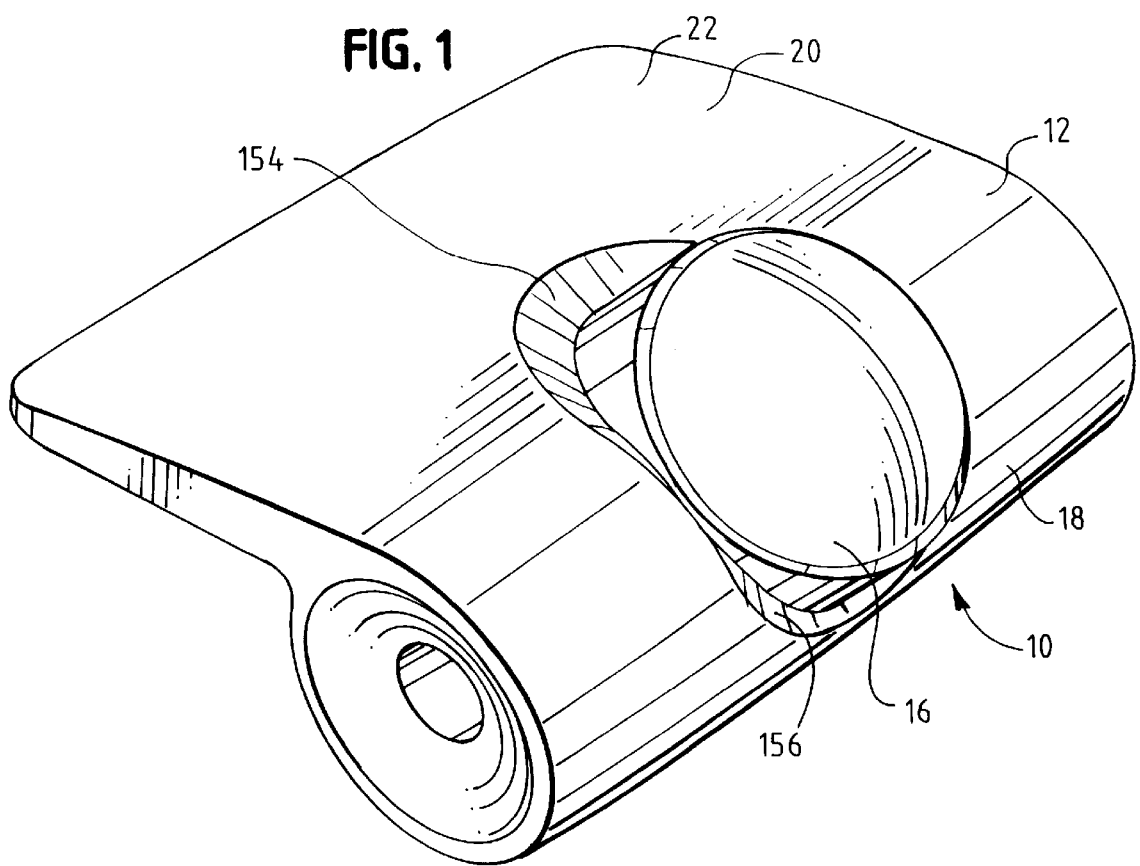
FIG. 1 is a front perspective view of a first embodiment of the clamp of the present invention.
Figure 2:
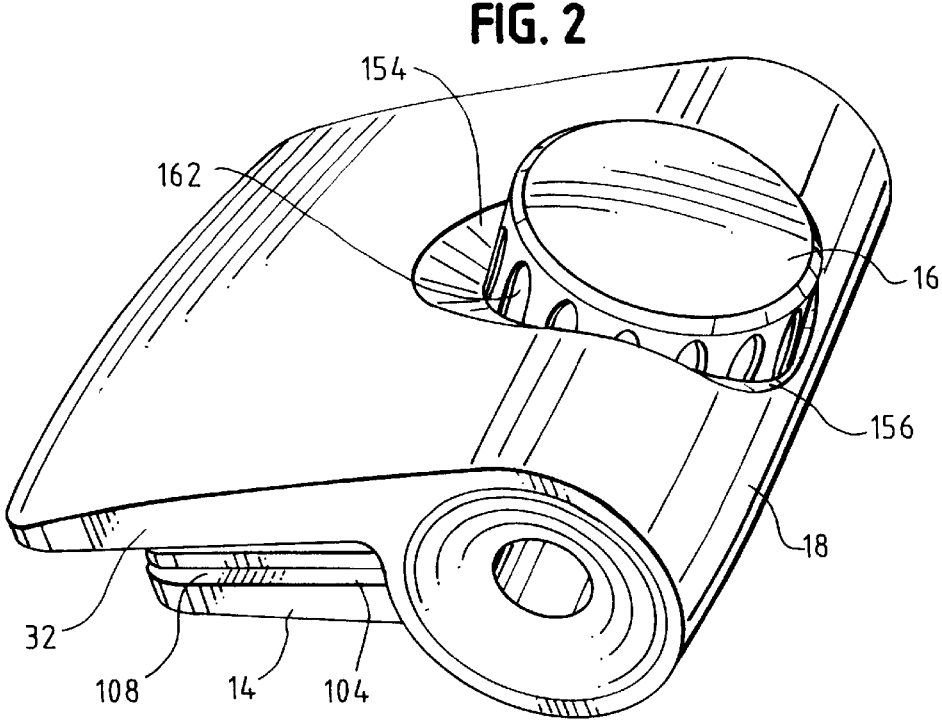
FIG. 2 is a front perspective view of the embodiment of the clamp shown in FIG. 1, from a lower elevation than FIG. 1.

As shown in FIGS. 1–6, the clamp 10 of the present invention includes a main clamp body 12, a jaw member 14, and a knob 16 that provides a way for a user to actuate a means for telescopingly adjusting the jaw member 14 with respect to the main clamp body 12. The main clamp body 12 includes a torso section, or generally spool-shaped section 18 integral with a rectangular section 20 having a front surface 22 that extends tangentially from the spool-shaped section 18. The term torso section is used to generally describe the spool-shaped section 18 of the main clamp body 12, because although that section is preferably spool-shaped, it will be understood that other shapes, such as barrel or elongated box-shapes may be used for the torso section. The rectangular section 20 preferably extends the entire height of the spool-shaped section 18. The rectangular section 20 has a rear side 24 opposite the front surface 22. The rear side 24 preferably includes a shallow recess 26 over the greater area thereof, delimited by the edge wall 28 extending around at least three sides of the perimeter of the rectangular section 20. The recess 26 securely receives a flat, pliant, non-abrasive, anti-skid pad 29, which serves as a front panel interface surface 30 (see FIG. 5B). An adhesive may be used to permanently secure the anti-skid pad 29 within the recess 26.

The rectangular section 20 further includes a pair of sidewalls 32, 34 that preferably taper from a relatively thick portion adjacent the spool-shaped section 18 down to a relatively narrow portion toward an outer edge 36 of the main clamp body 12 opposite the spool-shaped section 18.

The spool-shaped section 18 of the clamp 10 has a top end that includes a first accessory interface means 38, consisting of a concave area 40 having a central bore 42 therein. The opposing bottom end of the spool-shaped section 18 includes a second accessory interface means 44, similarly consisting of a concave area 46 having a central bore 48 therein. The central bore 48 of the second accessory interface means 44 is located coaxially with the central bore 42 of the first accessory interface means 38 along the central axis of the spool-shaped section 18.

Although the main clamp body 12 is shown as a solid part in FIGS. 1 and 3, the main clamp body 12 in a preferred embodiment of the present invention has waffle-like openings, such as openings 50 in the rear side of the spool-shaped portion 18 and openings 52 in the rear side of the rectangular section 20. These waffle-like openings 50, 52 are a result of the preferred method of manufacturing the main clamp body 12 using a durable, plastic, consisting of injection molding the main clamp body 12 as a single part. Advantageously, in most accessory mounting situations, virtually all the waffle-like openings 50 in the rear side of the spool-shaped section 18 are obscured from view by furniture panels or my a given associated accessory, and the openings 52 in the rectangular section 20, which are likewise obscured from view in most mounting situations, are obscured from view even when the clamp is not mounted to a furniture panel, because of the anti-skid pad 29 securely received in the recess 24.

As shown in FIG. 5, the spool-shaped section 18 also includes an elongated slot 54 that is open at the rear side of the clamp 10, and generally sideways T-shaped in cross-section. The elongated slot 54 has a shorter slot portion 56, i.e. the body of the T-shape of the elongated slot 54, at the center of the spool-shaped section 18. The shorter slot portion 56 terminates forwardly of the central axis of the spool-shaped section 18 on the rear side of a knob stage 58. The elongated slot 54 receives a first section 60 of the jaw member 14.

The first section 60 of the jaw member 14 is also sideways T-shaped in cross-section, and is telescopingly received in the elongated slot 54. The first section 60 is also referred to herein as a main clamp body interface member. The shorter slot portion 56 of the elongated slot 54 preferably has rounded sidewalls 62, 64, as shown in FIG. 5, to receive a complementary rounded front-most end portion 66 of the first section 60 of the jaw member 14 (see FIGS. 7, 8, 14 and 15). It is recognized, however, that the shorter slot portion 56 could have flat sidewalls, as opposed to rounded sidewalls 62, 64, in order to receive a jaw member having a flat-sided front-most end of the first section, provided that the shorter slot portion 56 terminated rearwardly of, or was narrower than, the knob stage 58.

Figure 14:
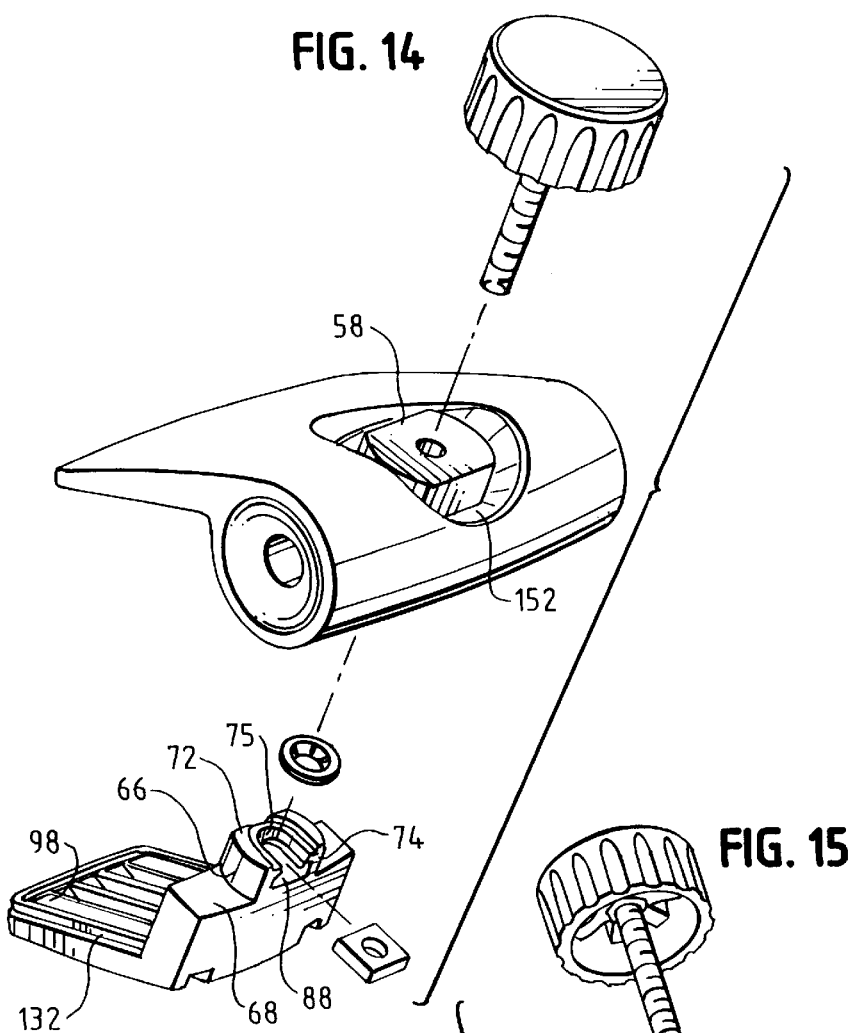
FIG. 14 is a front exploded view of the clamp shown in FIG. 6.

In addition to the front portion 66 that forms the body of its T-shape, the first section 60 of the jaw member includes a pair of flat ledges 68, 70, and terminates at a nose end 72 of the front-most end portion 66. Advantageously, the nose end 72 has a shallow U-shaped recess 74 therein to receive a metal push-on retaining fastener, also called a tinnerman, or a one-way fastener 76, as best shown in FIG. 14. Preferably, the one-way fastener 76 is press-fit into the U-shaped recess 74 and thereby securably retained therein.

As seen in FIG. 12, the one-way fastener 76 includes a plurality of integral metal wings 78 that define a circular tinnerman aperture 80. A forwardly-tapered portion 75 is provided in the front-most end portion 66 just forwardly of the U-shaped recess 74 (see FIGS. 7, 14) to provide clearance for the metal wings 78 of the one-way fastener 76. The integral metal wings 78 allow the threads of a threaded rod 82 connected to the knob 16 to be pushed through the aperture 80 during initial assembly of the clamp 10, but these integral metal wings 78 prevent the threaded rod 82 from being pulled out of the spool-shaped section 18 of the clamp 10. Thus, once assembled with the main clamp body 12 and the jaw member 14, the knob 16 and threaded rod 82 maintain a consistent position relative to the main clamp body 12, regardless of any rotation of the knob 16. Thus, any rotation of the knob 16 results solely in advancement of the jaw member 14 (i.e., tightening of the clamp) or retraction of the jaw member 14 (i.e., loosening of the clamp) relative to the main clamp body 12, without concomitant unwanted displacement of the knob 16 and threaded rod 82 relative to the main clamp body 12.

At the beginning of the travel of the jaw member 14, i.e. when the jaw member 14 is completely retracted within the main clamp body 12, the flat ledges 68, 70 of the first section 60 of the jaw member 14 contact corresponding interior ledges 84, 86 respectively, which form intermediate walls of the elongated slot 54 within the main clamp body 12. Similarly, at the beginning of the travel of the jaw member 14, the nose end 72 of the front-most portion 66 of the jaw member 14 also contacts the rear side of the knob stage 58 at the termination, i.e. the front end of, the shorter slot portion 56.

It will be understood that if the shorter slot portion 56 is longer than the front-most portion 66 of the first section 60 of the jaw member 14, the ledges 68, 70 will contact the corresponding interior ledges 84, 86 at the beginning of the travel of the jaw member 14, but the nose end 72 will not contact the rear side of the knob stage 58. Alternatively, if the front-most portion 66 is longer than the shorter slot portion 54, the nose end 72 will contact the rear side of the knob stage 58 at the beginning of the travel of the jaw member 14, but the ledges 68, 70 will not contact the corresponding interior ledges 84, 86. Regardless of whether the nose end 72 contacts the rear side of the knob stage 58, or the ledges 68, 70 contact the corresponding interior ledges 84, 86, what is important is that the jaw member 14 is prevented from being retracted any further into the spool-shaped section 18 of the main clamp body 12, and this point of contact defines the beginning of the travel of the jaw member 14.

Figure 15:
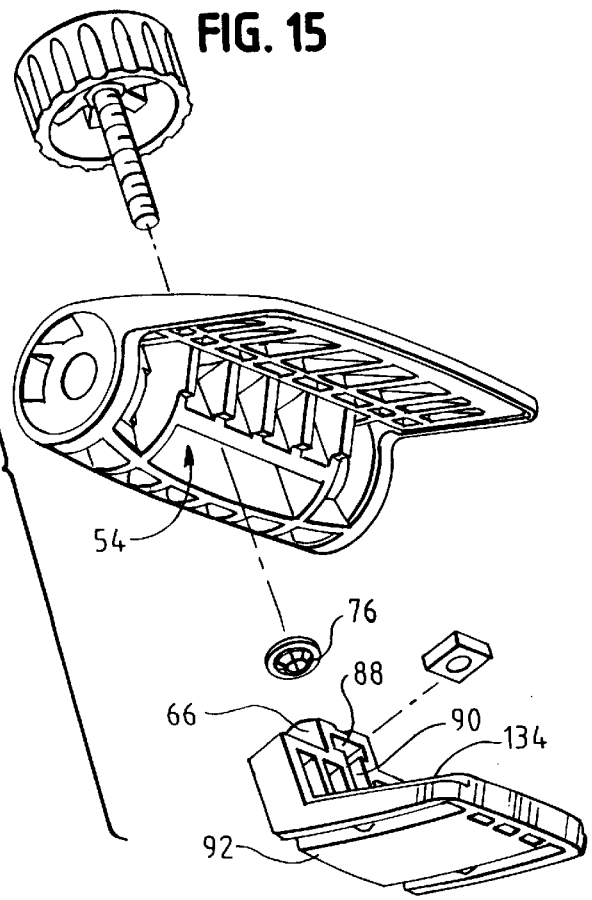
FIG. 15 is a rear exploded view of the clamp shown in FIG. 6.

The front-most portion 66 of the first section 60 of the jaw member 14 includes a fastener-receiving slot 88 spaced rearwardly from the nose end 72 and U-shaped recess 74. As shown in FIGS. 14 and 15, the fastener-receiving slot 88 extends all the way through the front-most portion 66. The first section 66 of the jaw member 14 further includes an elongated bore 90 that is open at the U-shaped recess 74 and nose end 72 of the jaw member.

The elongated bore 90 extends rearwardly through the front portion 66, and terminates forwardly of the rear face 92 of the jaw member 14. A thread-engaging fastener 76, such as a nut, is inserted in the fastener-receiving slot 88. Preferably, the knob 16 is permanently mounted to the threaded rod 82, e.g. by conventional insert-molding techniques during manufacture of the knob 16. During initial assembly of the clamp 10, after the threaded rod 82 is inserted in the spool-shaped section, the threaded rod 82 is pushed into locking engagement with the one-way fastener 76, which is inserted into the U-shaped recess 74, then the knob is rotated to advance the threaded rod 82 through the thread-engaging fastener 76 and into the elongated bore 90.

The thread-engaging fastener 76 and the rotating knob 16 provide a means for telescoping movement of the first section 60 of the jaw member 14 into and out of the main clamp body 12. As is explained in greater detail below, perpendicularity of the first section 60 of the jaw member 14 relative to the spool-shaped section 18 is achieved by this telescoping relationship of the main clamp body 12 and the jaw member 14 along the axis of the threaded rod 82 and the elongated bore 90.

A second section 94 of the jaw member 14 extends at an angle a of about 120° from the first section 60, and has a front side 96 opposite the rear face 92 of the jaw member 14. Similar to the rectangular section 20 of the main clamp body 12, the front side 96 of the second section 92 of the jaw member 14 has a shallow recess 98 therein to receive a pliant, non-abrasive flat anti-skid jaw pad 100 that serves as a rear panel interface surface 102. An adhesive may be used to permanently secure the anti-skid jaw pad 100 within the shallow recess 98. The anti-skid front and rear panel interface surfaces 30, 102 significantly reduce the likelihood of degradation of any panel surface to which the clamp 10 is secured, which is particularly important when the clamp 10 is secured to furniture items having stained wood or glass panels.

The grated appearance of both the front side 96 of the second section 94 and an inwardly-directed side 103 of the first section 60 of the jaw member 14 is due to the injection molding process by which the jaw member 14 is manufactured. Advantageously, the anti-skid rear panel interface surface 102 hides the grated appearance of the front side 96, and both the spool-shaped portion 18 of the clamp 10 and an accessory with which the clamp is mounted generally obscure the grated appearance of the inwardly-directed side 103 of the first section of the jaw member.

The rear panel interface surface 102 extends parallel to the front panel interface surface 30 of the rectangular section 20 of the main clamp body 12 at all times throughout the travel of the jaw member 14 relative to the main clamp body 12. The jaw member 12 is preferably shorter in height than the main clamp body 12.

The jaw member 14 of the clamp 10 includes a third accessory interface means that can take one of several forms. In the embodiment of the clamp 10 of the present invention shown in FIGS. 2 and 3, the third accessory interface means takes the form of a continuous lateral groove 104 in three side walls of the second section 94 of the jaw member 14. The lateral groove 104 couples with corresponding apertures (not shown) in accessories to be secured to the clamp 10 by means of upper and lower edges 106, 108 of the groove 104 that sandwich the outer edges of such corresponding apertures therebetween. Alternatively, it will be understood that the second section 64 of the jaw member 14 could include a system of interrupted lateral grooves or recesses (not shown) in three of its outer edges to form the third storage accessory interface means. This system of interrupted lateral grooves cooperates with corresponding flanges and apertures (not shown) formed in the associated storage accessories to provide an interlocking mounting of the clamp to the given storage accessory.

More preferably, the third accessory interface means is in a form shown with reference to the embodiment of the clamp 10 and its components shown in FIGS. 6, 7, 8, 13, 23, 24, and 27. In this embodiment, the third accessory interface means takes the form of an interlocking mechanism for selectively coupling the jaw member 14 with a clamp-to-accessory interface 110 (see FIG. 13). The clamp-to-accessory interface 110 is permanently attached to a given accessory at the time of manufacture, for example by solvent-welding. During manufacture, accessories are provided with a receptacle 112 sized to receive the clamp-to-accessory interface. Rigidity members 114, 116 are also provided in the vicinity of the receptacle 112 to reinforce the securement of the clamp-to-accessory interface 110 and the accessory. Rigidity members 114, 116 also assist in distributing loads applied to the accessory by various objects that may be placed in the accessory, because such loads could otherwise concentrate at the point of connection between the jaw member 14 and the clamp-to-accessory interface 110, which could, over time, compromise the integrity of their locking engagement.

In order to lockingly engage the jaw member 14 with the clamp-to-accessory interface 110, the rear face 92 of the second section 94 of the jaw member 14 is provided with a pair of parallel locking channels 118, 120. Each of the locking channels 118, 120 is provided with a raised locking bump or ridge 122, 124. The clamp-to-accessory interface 110 is provided with a top ledge 126 having integral inwardly-directed flanges 128, 130. The shallow recess 98 of the jaw member 14 has two side-walls 132, 134 (see FIGS. 14, 15) that are spaced inwardly from the outer side walls 133, 135 of the second section 94. Preferably, the integral flanges 128, 130 engage the side-walls 132, 134 to help secure the jaw member 14 within the clamp-to-accessory interface 110.

The integral flanges 128, 130, the floor 136, and side walls 138, 140 of the clamp-to-accessory interface 110 thus define a jaw-receiving channel 142. The side walls 138, 140 of the clamp-to-accessory interface 110 can have a tapered profile to complement a tapered profile of the outer side walls 133, 135 of the second section 94. The parallel locking channels 118, 120 gradually increase in depth across the length of the second section 94. The entrance of the jaw receiving channel is preferably curved and rounded to facilitate insertion of the narrowest or distal end 137 of the second section 94 of the jaw member 14.

Complementing the locking channels 118, 120 of the jaw member 14, the floor 136 of the clamp-to-accessory interface includes a pair of raised ramp members 144, 146. Each of the ramp members 144, 146 is provided with a ridge-receiving depression 148, 150. As the jaw member 14 of the assembled ramp 10 is pushed into the jaw-receiving channel 142, the ramp members 144, 146 enter the locking channels 118, 12, forcing the ridges 122, 124 to ride up the ramps. This motion continues until the ridges 118, 120 fall into the ridge-receiving depressions 148, 150, resulting in a "snap" that the user can feel and hear. This snap-lock feature confirms to the user that the jaw member is securely locked within the clamp-to-accessory interface. To remove a given accessory from the clamp 10, sufficient force is applied to pull the ridges 118, 120 out of the ridge-receiving depressions 148, 150, then the jaw member 14 is simply pulled out of the jaw-receiving channel 142.

The spool-shaped section 18 of the main clamp body 12 has a knob-receiving aperture 152 centrally located toward the front side of the spool-shaped section 18. Crescent-shaped depressions 154, 156 in the spool-shaped section 18 preferably bound the knob-receiving aperture 152, and provide increased accessibility to the knob 16 when the knob 16 is secured in the knob-receiving aperture 152. The cylindrical sidewall 158 (see FIG. 9) of the knob 16 is seated in a gap 160 between the outer wall of the knob-receiving aperture 152 and the knob stage 58. The knob 16 is preferably provided with a plurality of depressions 162 in its outer surface to provide a textured surface to facilitate gripping of the knob 16. Like the main clamp body 12 and the jaw member 14, the knob 16 is preferably manufactured using injection molding of plastic. As discussed above, conventional insert-molding techniques are preferably utilized to permanently mount the threaded rod 82 within the knob 16.

As will be understood, the direction of the threads of the threaded rod 82 will determine in which direction, i.e. clockwise or counter-clockwise, the knob 16 is rotated to result in loosening or tightening the clamp, respectively. The distance between the front panel interface surface 24 and rear panel interface surface 66 is thus advantageously controlled by turning the knob 16, allowing the user to control the clamping force, i.e. the amount of force exerted by the clamp 10 onto an associated furniture panel.

Turning to FIGS. 16–20, one of the advantages of the clamp 10 of the present invention is its ability to be used as a hinge 200. To form the hinge 200, the clamp 10 is combined with a pair of C-shaped mounting members or hinge-halves 202, 204. The hinge-halves 202, 204 are rotatably coupled to the first accessory interface means 38 by an upper hinge pin 206, and are rotatably received in the second accessory interface means 44 by a lower hinge pin 208. The upper hinge pin 206 is inserted through an upper pintle bore 207 in the first hinge-half 202, and into the bore 42 in the top of the spool-shaped section 18 of the clamp body 12. The lower hinge pin 208 is inserted through a lower pintle bore 209 in the second hinge-half 204, and into the bore 48, directly opposite the upper hinge pin 206.

A convex cover 210 may, but need not, be used to protect the connection of the upper hinge pin 206 to the first accessory interface means 38. Another convex cover (not shown, but similar to convex cover 210) may likewise, but need not, be used to protect the connection of the lower hinge pin 208 with the second accessory interface means 44.

Figure 18:
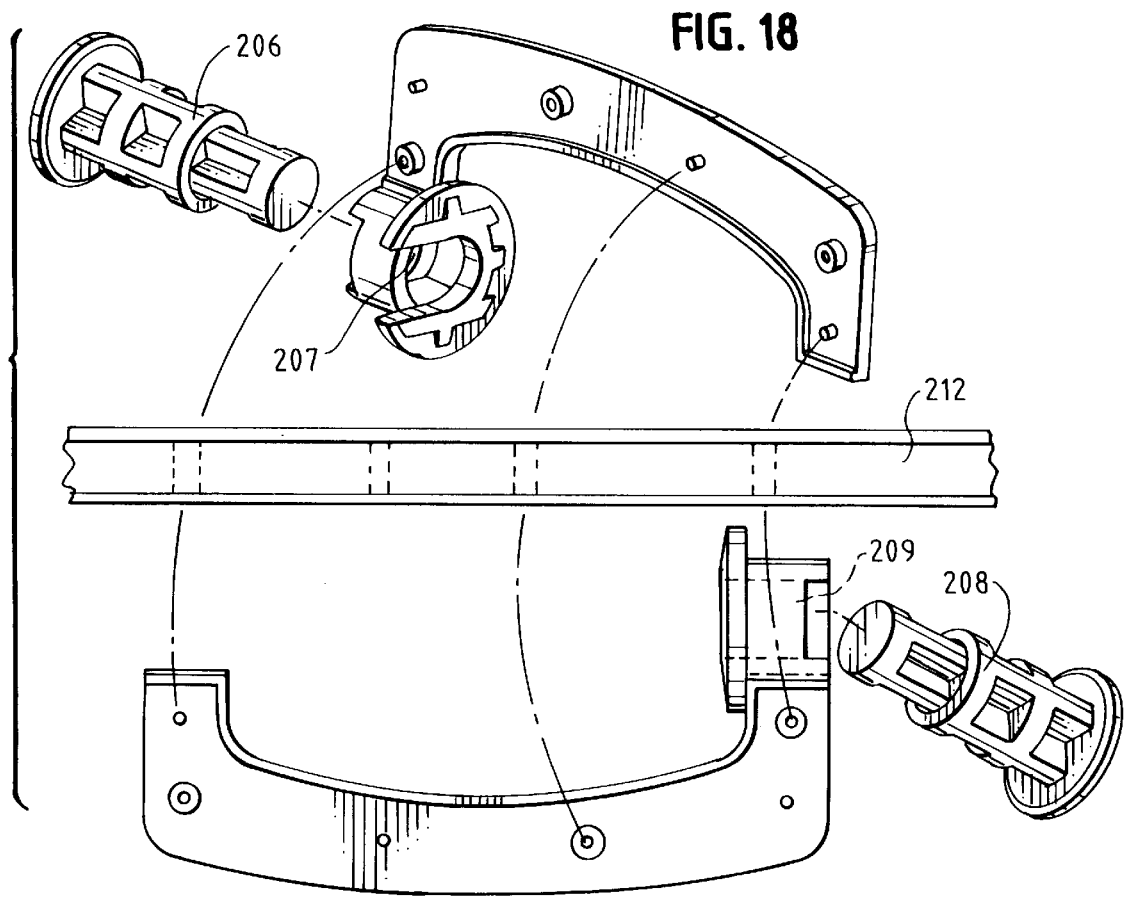
FIG. 18 is an exploded view of the two hinge-halves in combination with a pair of hinge pins and an accessory panel, with the clamp removed for clarity.
Figure 19:
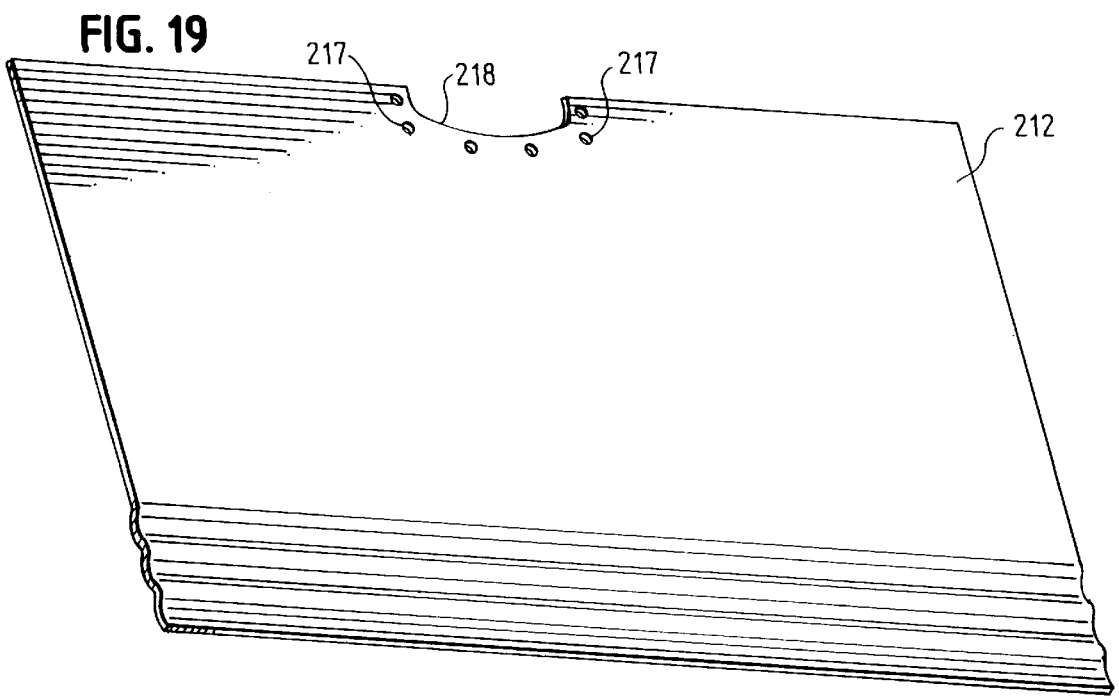
FIG. 19 is a rear perspective view of an accessory panel of the present invention, rotated 90°.
Figure 20:
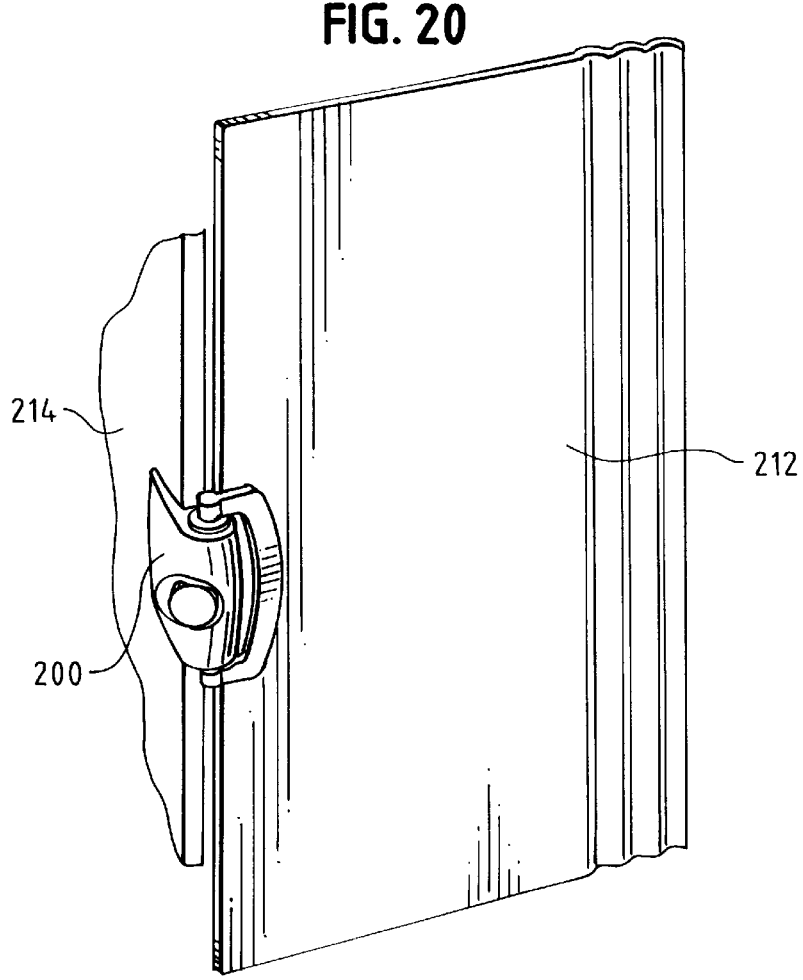
FIG. 20 is a front perspective view of the clamp of FIG. 16 in combination with the pair of hinge-halves to form a hinge used to hingedly mount an accessory panel to a vertical furniture panel.

The hinge 200 can advantageously be used to hingedly mount an accessory 212, such as a door panel, a dry erase board, a cork board, etc., to a vertical furniture panel 214 or the like, as shown in FIG. 20. The accessory 212 is preferably secured between the hinge-halves 202, 204, as shown in FIG. 18, by hinge-to-accessory mounting means in the form of a plurality of integral interlocking pins 215 and pin receivers 216 at alternating positions along each of the hinge-halves 202, 204, which pass through corresponding holes 217 provided in the accessory 212. As seen in FIG. 19, the door panel accessory 212 is further provided with an indented portion 218 at the edge of the accessory 212 to provide clearance for the clamp 10 and knob 16 during relative rotation of the clamp 10 and the accessory 212 so as to maximize the freedom of rotation of the door panel accessory 212 about the vertical furniture panel 214.

Figure 21:
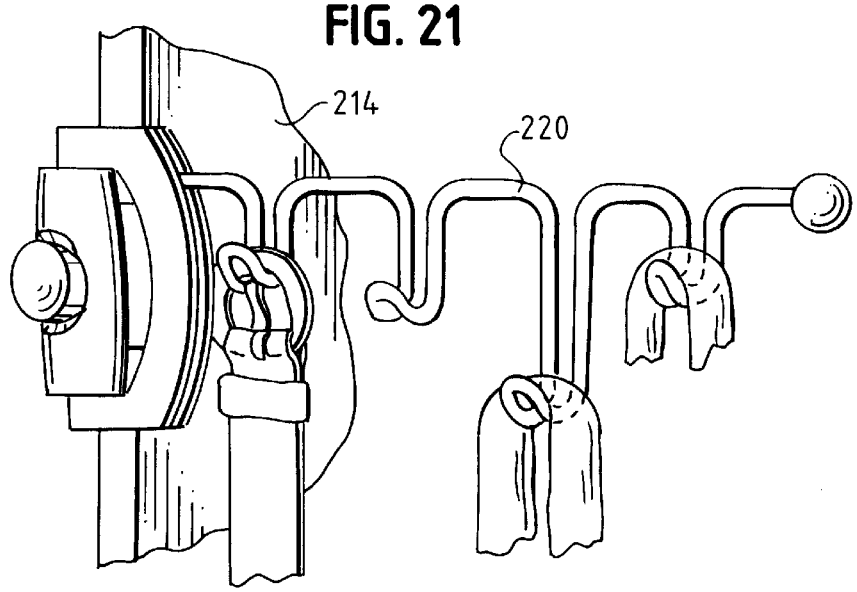
FIG. 21 is a perspective view of the clamp of FIG. 16 in combination with a pair of hinge-halves to form a hinge used to hingedly mount a tie rack hook accessory to a vertical furniture panel.

The clamp 10 can then be secured (by tightening the clamp 10 using knob 16) to the vertical furniture panel 214. Various alternate uses for the hinge 200 are also possible with the present invention, such as shown in FIG. 21, wherein the hinge 200 is used to pivotally mount a tie rack hook accessory 220 to a vertical furniture panel 214.

It will be understood that the door panel accessory 212 can alternatively be secured to the hinge-halves 202, 204 by means of a plurality of pins in the form of push-pins (not shown) that pass through aligned apertures in the accessory 212 and at least one of the hinge-halves 202, 204.

Figure 22:
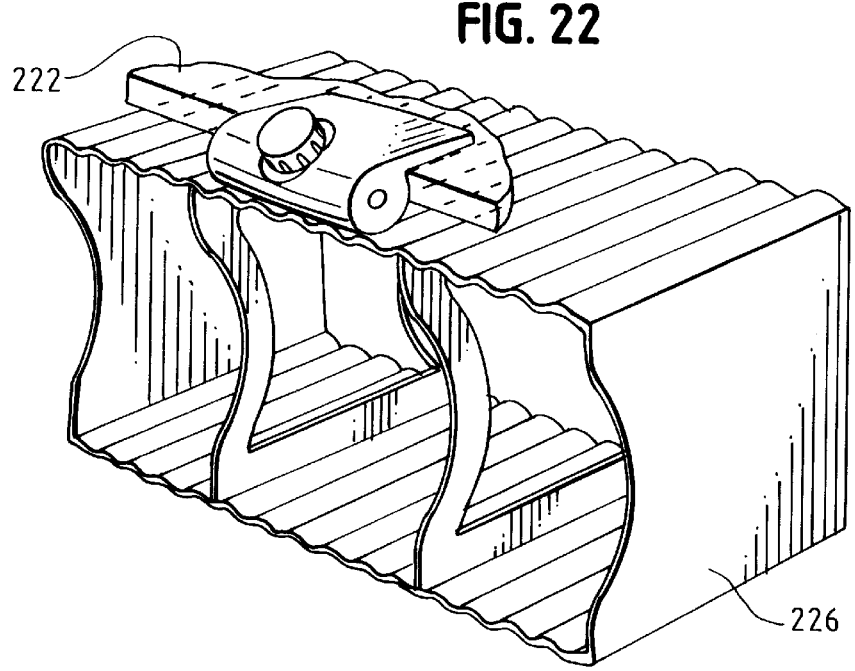
FIG. 22 is a front perspective view of the clamp shown in a horizontal orientation to secure a storage box to a shelf.
Figure 23:
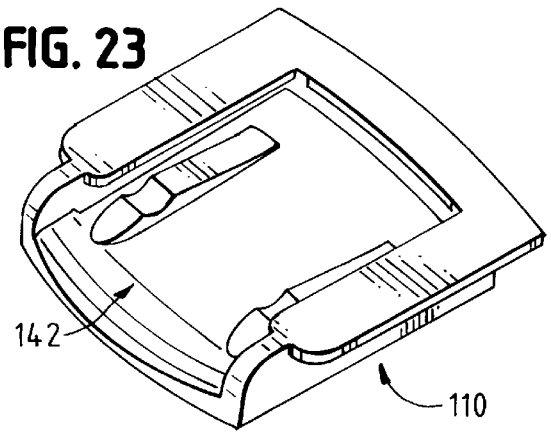
FIG. 23 is a front perspective view of the clamp-to-accessory interface.
Figure 24:
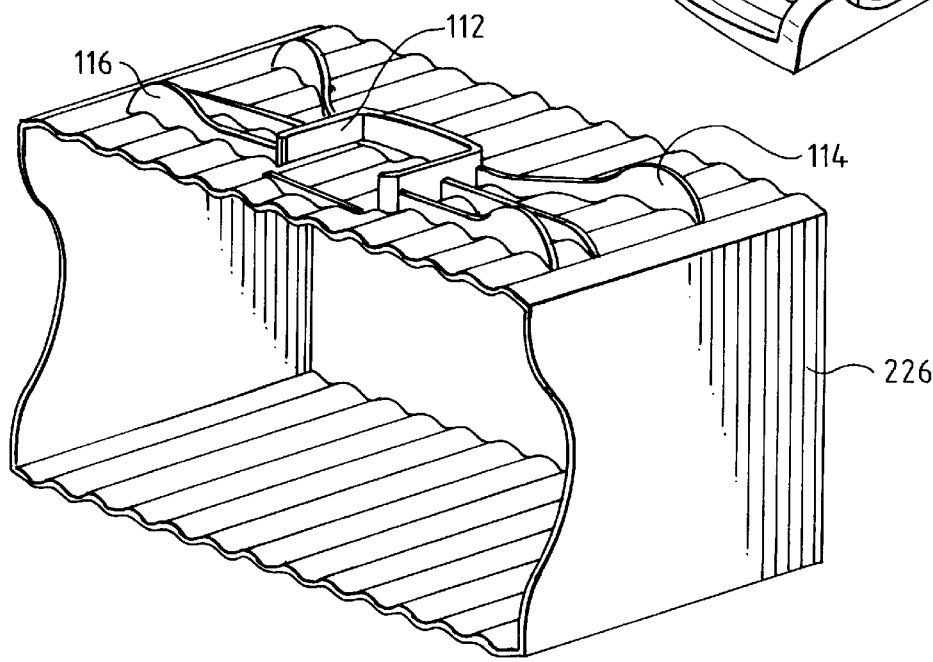
FIG. 24 is a front perspective view of a storage box adapted to accommodate the clamp-to-accessory interface.
Figure 25:
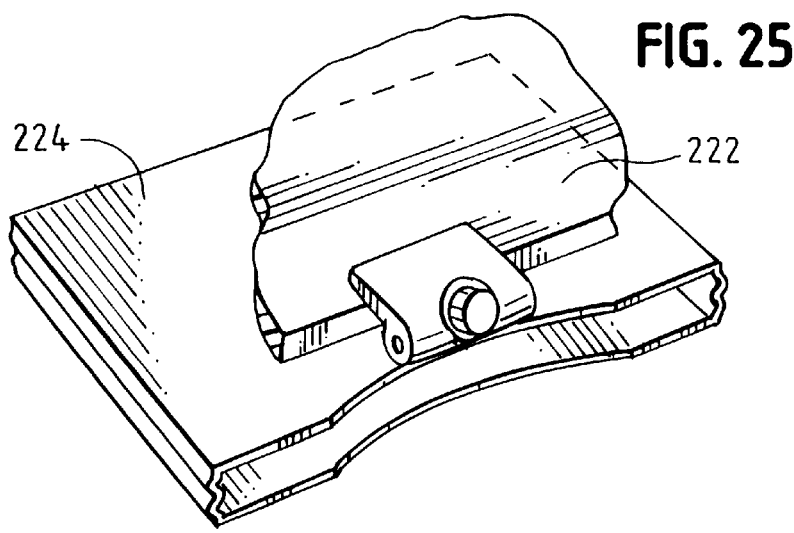
FIG. 25 is a front perspective view of the clamp shown in a horizontal orientation to secure a document box to a shelf.
Figure 26:
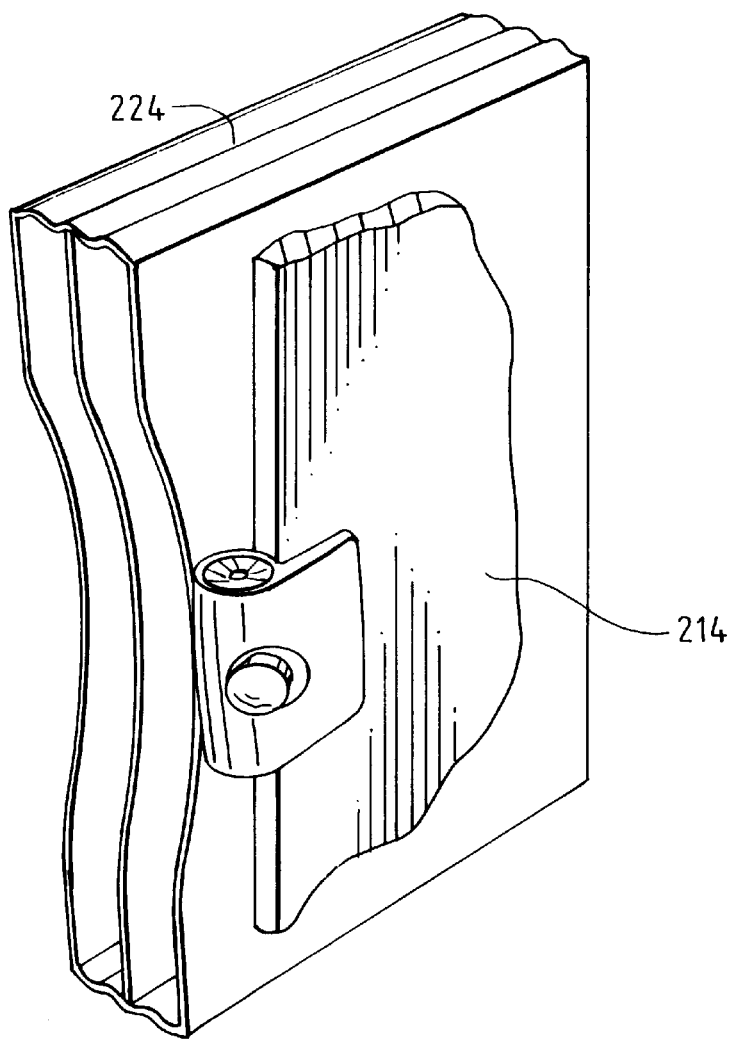
FIG. 26 is a perspective view of the clamp shown in a vertical orientation to secure a document box to a vertical furniture panel.
Figure 27:
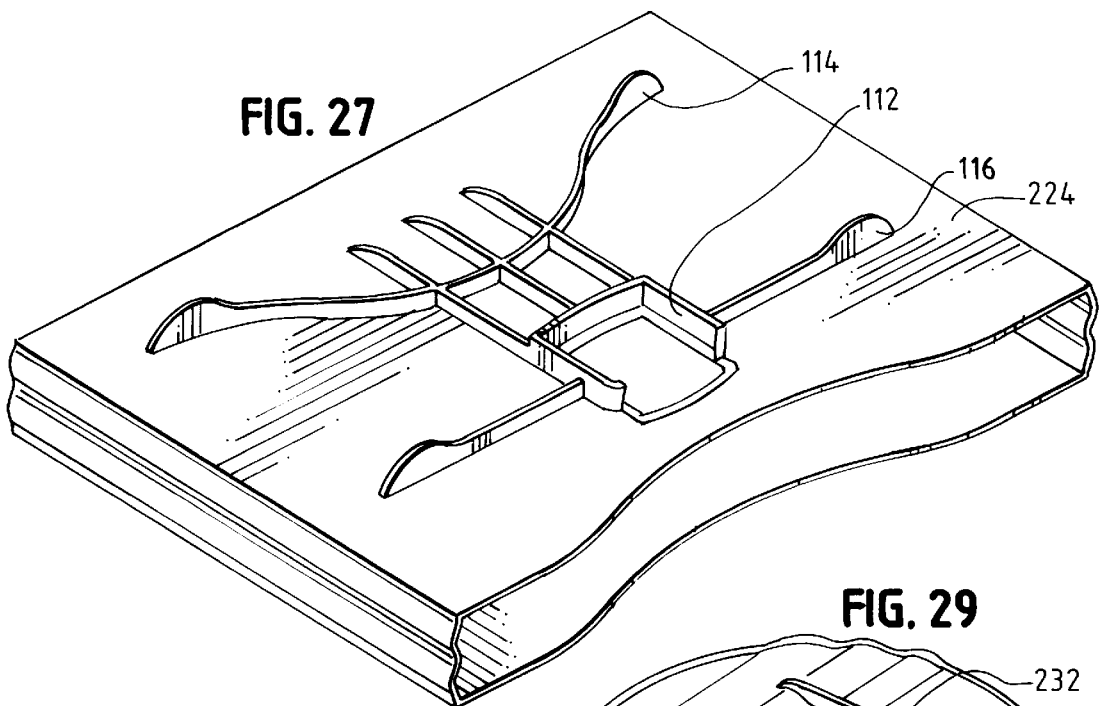
FIG. 27 is a front perspective view of a document box adapted to accommodate the clamp-to-accessory interface.

FIGS. 22, 25, and 26 demonstrate the use of the clamp 10 to hold other storage accessories to a vertical furniture panel 214 or shelf 222, such as a document holder 224 mounted horizontally in FIG. 25 and mounted vertically in FIG. 26, or a storage box 226. These storage accessories are also the subject of Kenlin Enterprises, Inc.'s co-owned design patent application Ser. No. 29/107,526. The accessories shown in the drawings are only by way of example to demonstrate the versatility of the clamp 10.

As explained above, the third storage accessory interface means is used for mounting either the document holder 224 or the storage box 226 to the clamp 10. Thus, the document holder 224 and the storage box 226 each preferably include the receptacle 112 for receiving the clamp-to-accessory interface 110, and have the clamp-to-accessory interface 110 permanently mounted therein.

Advantageously, as shown in FIGS. 20, 22, 25, and 26, the main clamp body 12, the knob 16, and the given storage accessory tend to obscure the third storage accessory interface means from view in either horizontal or vertical orientations of the clamp 10 when clamped to a vertical furniture panel 214 or to a shelf 222. This feature creates a desired optical effect that the given storage accessory is permanently connected to the clamp 10. In reality, the storage accessory can be easily removed from the clamp 10 and replaced with a different storage accessory, in most cases by unlocking the jaw member 14 from the clamp-to-accessory interface 110, and inserting the jaw member 14 in the jaw member recess 142 of another clamp-to-accessory interface attached to the new accessory.

Figure 29:
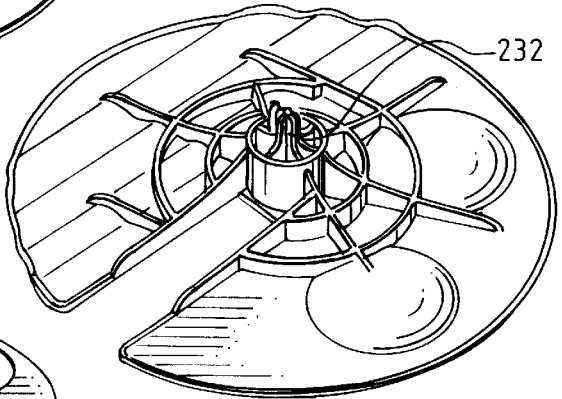
FIG. 29 is a bottom perspective view of the circular shelf of FIG. 28.
Figure 28:
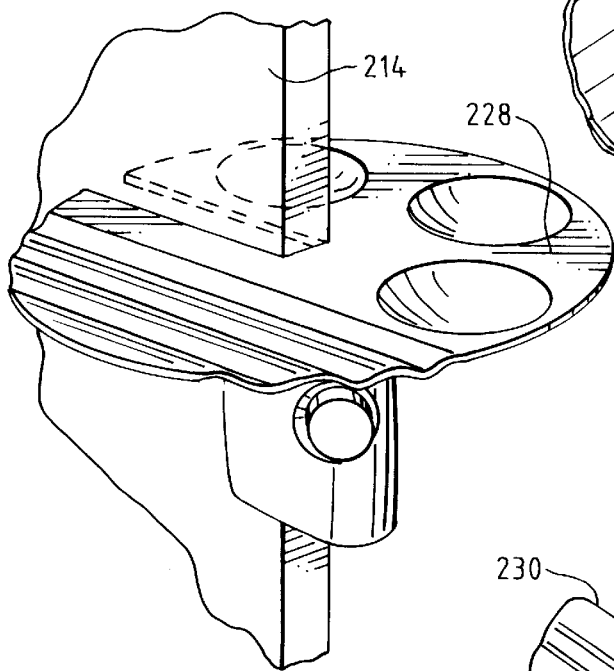
FIG. 28 is a front perspective view of the clamp shown in a vertical orientation to secure a circular shelf to a vertical furniture panel.
Figure 30:
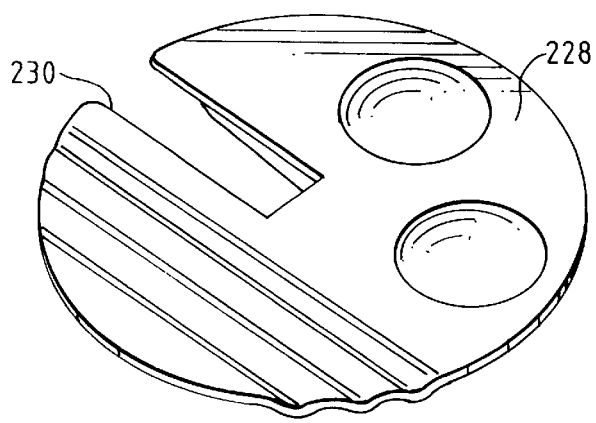
FIG. 30 is a top perspective view of the circular shelf of FIGS. 28 and 29.

Yet another example of the versatility of the clamp 10 is shown in FIG. 28, wherein the first accessory interface means 38 is used to mount a generally round shelf 228 having a U-shaped groove 230 therein to a vertical furniture panel 214. Such a round shelf 228 is convenient for holding small items, such as paper clips, reading glasses, rubber bands, a coffee cup, a computer mouse or another computer input device. Preferably, as shown in FIG. 29, the round shelf 228 is provided with an integral mounting pin 232 that is received in the central bore 42 of the first accessory interface means 38 of the clamp 10.

While the present invention has been described with respect to certain embodiments thereof, it will be understood that many variations of the present invention are possible and still fall within the scope of the appended claims. Furthermore, while the clamp 10 of the present invention has been shown in combination with certain exemplary storage accessories, its use is not intended to be limited thereto, and it will be appreciated by those of ordinary skill in the art that the clamp of the present invention can be used with a large variety of accessories and for a wide array of uses too numerous to list.

We claim:

1. A clamp for mounting storage accessories to panel members comprising:
   a main clamp body having a torso section with upper and lower ends and a main wall member extending in a first direction from said torso section, the main wall member having a generally flat first panel interface surface;
   first accessory interface means located in said upper end of the torso section;
   second accessory interface means located in said lower end of the torso section;
   a jaw member telescopingly mounted to said torso section, said jaw member including a main clamp body interface member and a second section integral with said main clamp body interface member and having a generally flat second panel interface surface said second panel interface surface being parallel to and spaced apart from said first panel interface surface;
   adjustment means for controlling telescopic movement of said jaw member relative to said main clamp body;
   a third accessory interface means including said jaw member, said third accessory interface means comprising a lateral recess in an outer perimeter of the second section of the jaw member to mate with a corresponding portion of an accessory to be secured to the clamp for a bayonet-type fitting.

2. A clamp for mounting storage accessories to panel members comprising:
   a main clamp body having a torso section with upper and lower ends and a main wall member extending in a first direction from said torso section, the main wall member having a generally flat first panel interface surface;
   first accessory interface means located in said upper end of the torso section;
   second accessory interface means located in said lower end of the torso section;
   a jaw member telescopingly mounted to said torso section, said jaw member including a main clamp body interface member and a second section integral with said main clamp body interface member and having a generally flat second panel interface surface, said second panel interface surface being parallel to and spaced apart from said first panel interface surface;
   adjustment means for controlling telescopic movement of said jaw member relative to said main clamp body;
   a third accessory interface means including said jaw member, said third accessory interface means comprising a system of spaced lateral recesses in an outer perimeter of the second section of the jaw member to mate with a corresponding system of alternating flanges and recesses of an accessory to be secured to the clamp for an interlocking fitting.

3. A clamp for mounting storage accessories to panel members comprising:
   a main clamp body having a torso section with upper and lower ends and a main wall member extending in a first direction from said torso section, the main wall member having a generally flat first panel interface surface;
   first accessory interface means located in said upper end of the torso section;
   second accessory interface means located in said lower end of the torso section;
   a jaw member telescopingly mounted to said torso section, said jaw member including a main clamp body interface member and a second section integral with said main clamp body interface member and having a generally flat second panel interface surface, said second panel interface surface being parallel to and spaced apart from said first panel interface surface;
   adjustment means for controlling telescopic movement of said jaw member relative to said main clamp body;
   a third accessory interface means including said jaw member, said third accessory interface means comprising:
   a clamp-to-accessory interface secured to an accessory, said clamp-to-accessory interface including:
   a floor;
   a pair of parallel side walls;
   at least one upper ledge substantially covering a top of each of said side walls and extending inwardly from each of said side walls, said upper ledge, said side walls, and said floor forming a jaw-receiving channel having a jaw-member entrance at a first edge of said floor; and means for lockingly receiving said second section of the jaw member; and in said second section of the jaw member, an engagement means for engaging said means for lockingly receiving said second section of the jaw member.

4. The clamp of claim 3, wherein said means for lockingly receiving said second section of the jaw member includes a pair of parallel ramps on said floor extending parallel to said side walls and a ridge-receiving depression in each of said ramps;

and wherein said engagement means in said second section of the jaw member includes a pair of parallel locking channels located in a rear face thereof; and a raised ridge in each of said locking channels, whereby when said second section of said jaw member is introduced to said jaw-member entrance, said locking channels align with said ramps, and when said jaw member is received by said jaw-receiving channel, said ridges ride along said ramps until the ridges are lockingly received in said ridge-receiving depressions.

5. The clamp of claim 4, wherein said second section of the jaw member has side walls tapered from a relatively wide thickness at a proximate edge adjacent said main clamp body interface member, down to a relatively narrow thickness at a distal end opposite the main clamp body interface member.

6. The clamp of claim 5, wherein said parallel locking channels increase in depth from said distal end toward said proximate edge of the second section of the jaw member.

7. The clamp of claim 6, wherein said side walls of the clamp-to-accessory interface member are tapered to complement said second section of the jaw member.

8. The clamp of claim 3, wherein said jaw member includes a walled recess on a front face of the second section thereof, the walls of said walled recess being spaced inwardly of an outer perimeter of the second section of the jaw member, and said walled recess receiving a non-abrasive, anti-skid jaw member pad having a front anti-skid pad face defining said second panel interface surface.

9. The clamp of claim 8, wherein each of said walls of the walled recess rides along an inner edge of said upper ledge of the clamp-to-accessory interface during insertion of said second section of the jaw member into the jaw-receiving channel.

10. A clamp for mounting accessories to furniture, comprising:

a main clamp body having a generally spool-shaped section with a knob-receiving aperture centrally located therein and upper and lower opposing ends, respectively including first and second accessory interface means therein, and a generally rectangular section extending tangentially from said spool-shaped section, the rectangular section including a rear-facing flat panel interface surface;

a jaw member having a first section telescopingly mounted to said spool-shaped section of the main clamp body, and a second section integral with said first section, and forming an angle of about 120° with said first section, said second section including a front-facing flat panel interface surface on a front side thereof being positioned parallel to said rear-facing flat surface interface of the rectangular section of the main clamp body, and remaining parallel to said rear-facing flat surface interface throughout the telescoping travel of the jaw member within the spool-shaped section of the main clamp body; and a knob member rotatingly received within said knob-receiving aperture, said knob member controlling a means for telescopingly actuating said jaw member within said spool-shaped section of the main clamp body.

11. The clamp of claim 10, wherein said accessory interface means in said upper and lower opposing ends of the spool-shaped section each comprises a centrally located aperture, said aperture in the upper end being coaxial with the aperture in the lower end.

12. The clamp of claim 11, rotatably engaged with an accessory interface member, said accessory interface member including a pair of hinge-halves, said hinge-halves being rotatably mounted to said main clamp body by a pair of hinge pins that are rotatably received in each of said first and second accessory interface means, whereby the clamp in combination with said accessory interface member forms a hinge.

13. The clamp of claim 12, wherein said hinge-halves are substantially C-shaped.

14. The clamp of claim 13, wherein said hinge-halves are provided with securement means to sandwich an accessory therebetween, whereby said accessory is supported by said combination of the clamp, the hinge pins, and the accessory interface member.

15. The clamp of claim 14, wherein said securement means comprises a plurality of pins extending through said accessory and engaging at least one of said hinge-halves.

16. The clamp of claim 15, wherein said securement means includes a plurality of pairs of interlocking integral pins and pin-receivers on inwardly-directed faces of said hinge-halves.

17. The clamp of claim 16 in combination with said accessory, wherein said accessory is adapted to include a plurality of apertures for receiving said pairs of pins and pin-receivers.

18. The clamp of claim 15, wherein said plurality of pins are pin fasteners, each of which extend through aligned pin-receiving apertures in said accessory and in at least one of said hinge-halves.

19. The clamp of claim 10, wherein said means for telescopingly actuating said jaw member within said spool-shaped section of the main clamp body includes a threaded rod extending from an inside of said knob through a bore in said first section of the jaw member, and a thread-engaging fastener securably received in a fastener receiving slot located in said first section of the jaw member, said fastener receiving slot being located coaxially with said bore, and said thread-engaging fastener riding along said threaded rod, whereby rotation of said knob results in a corresponding displacement of said thread-engaging fastener and said jaw member.

20. The clamp of claim 19, wherein said first section of the jaw member includes a recess therein separated form said fastener receiving slot, and further comprising a one-way fastener securely received in the recess for rotatably securing said knob in the knob-receiving aperture by providing a constant engagement between the threaded rod and the thread-engaging fastener.

21. The clamp of claim 20, wherein said recess is substantially U-shaped.

* * * * *